United States Patent [19]
Brown

[11] 3,893,661
[45] July 8, 1975

[54] C CLAMP STRUCTURE

[76] Inventor: Lorin B. Brown, 1501 S. Manhattan Pl., Los Angeles, Calif. 90019

[22] Filed: Apr. 1, 1974

[21] Appl. No.: 456,834

[52] U.S. Cl. .................. 269/97; 269/101; 269/249
[51] Int. Cl. ............................................. B23q 3/04
[58] Field of Search ............. 269/4, 45, 81, 91, 95, 269/96, 97, 101, 151, 164, 249; 248/226 A, 229

[56] References Cited
UNITED STATES PATENTS

| 1,136,963 | 4/1915 | Keith | 269/91 |
| 1,973,238 | 9/1934 | Walter | 269/101 |
| 2,471,361 | 5/1949 | Trefz | 269/95 |

FOREIGN PATENTS OR APPLICATIONS

| 975,514 | 3/1950 | France | 269/81 |

Primary Examiner—Roy Lake
Assistant Examiner—Mark S. Bicks
Attorney, Agent, or Firm—John T. Matlago

[57] ABSTRACT

A C clamp is formed of a frame with an elongated bight portion having a hexagonal cross section. The frame may be mounted with any of the surfaces on its bight portion bearing against a support. Another clamp bearing on the opposing parallel surface on the bight portion secures the frame to the support.

4 Claims, 6 Drawing Figures

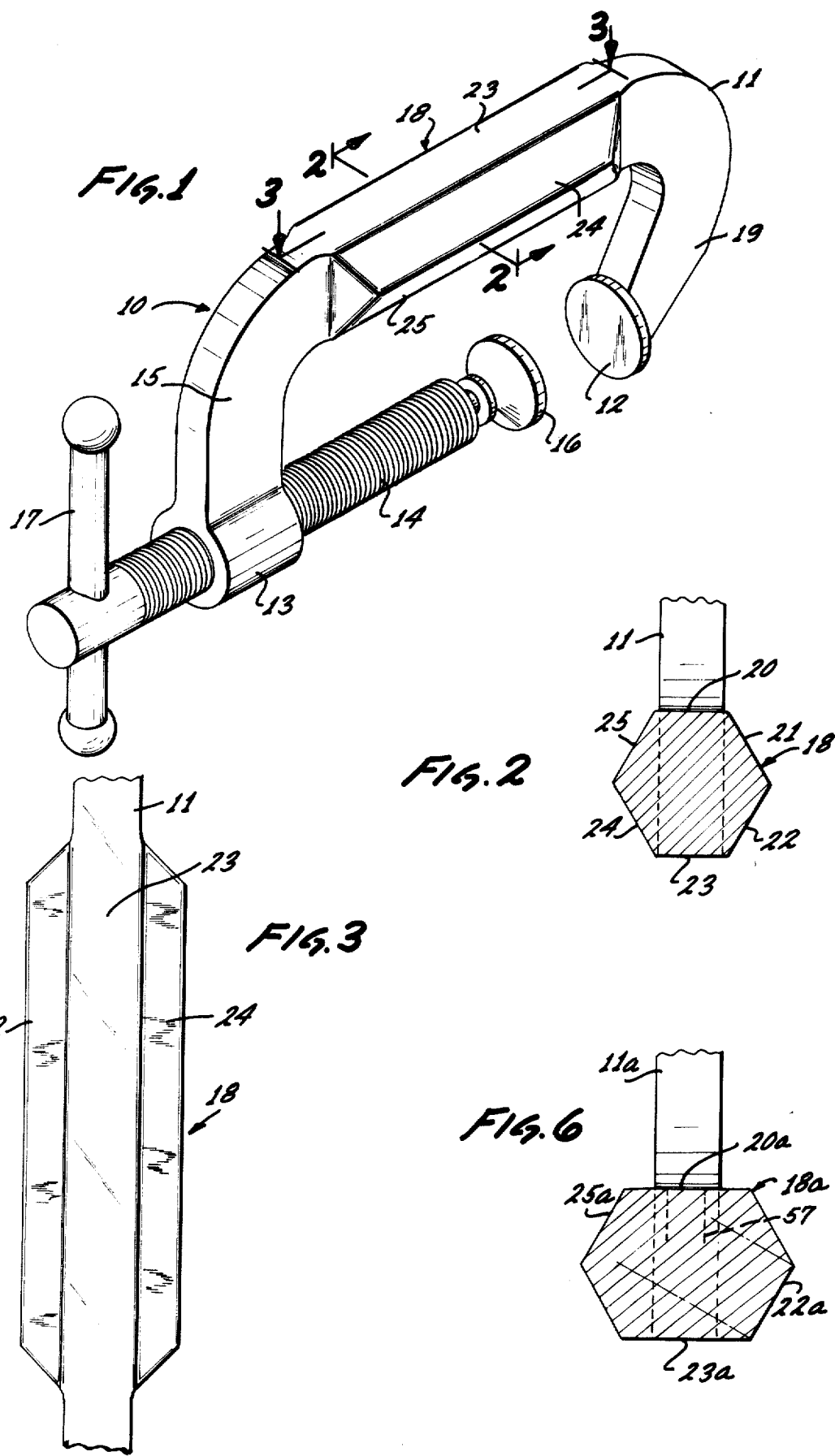

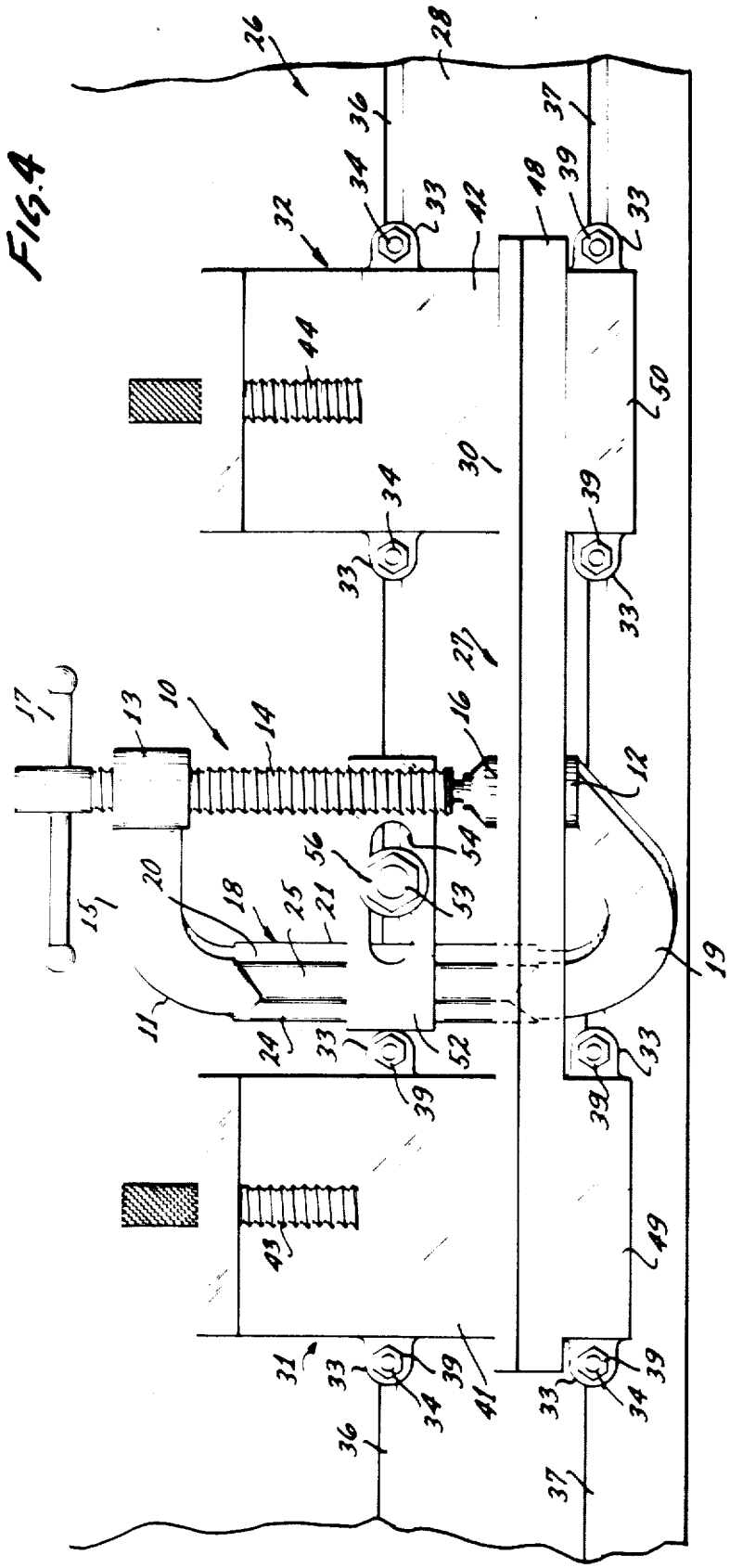
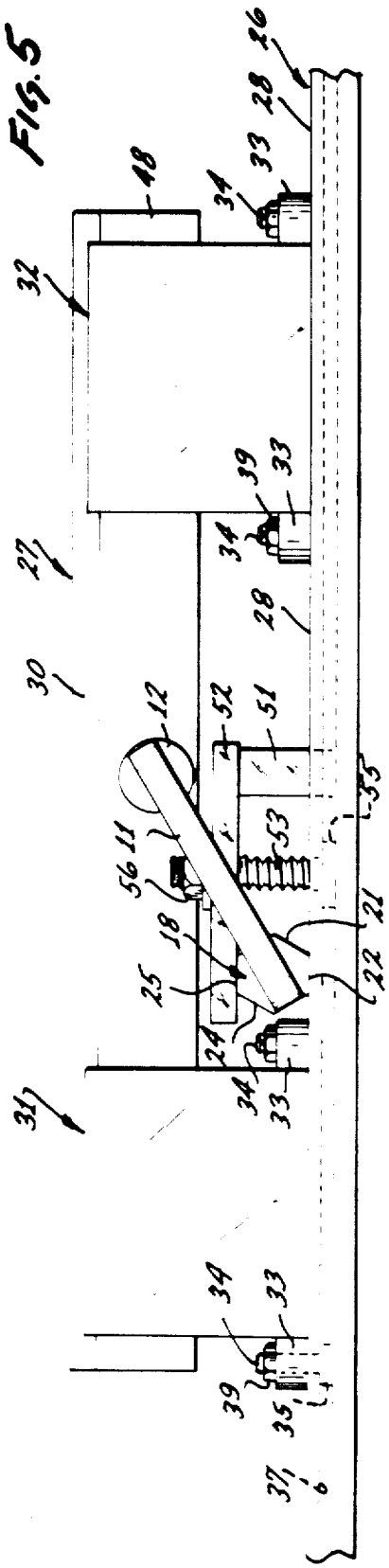

C CLAMP STRUCTURE

This invention pertains to workpiece hold down elements and more particularly to an improved clamping fixture useful for setting up workpieces on machine tools.

In order to machine a workpiece it is necessary to securely hold it down on the table of a machine tool such that it can withstand the forces of the cutting tool. Vices adapted to be mounted on such a table are commonly used for this purpose. However, because of the desire to hold down the cost of setup fixtures that are made available with a machine tool in a production shop, it frequently happens that not enough vices are kept on hand to properly securely hold a workpiece on the table. Thus, there is a need for a simple, inexpensive, clamping fixture which can be used when needed along with the vices as workpiece hold down elements.

Accordingly, the object of the present invention is to provide an improved C clamp structure which can be simply and effectively used as a workpiece hold down element in a machine shop.

Another object of the invention is to provide an improved C clamp especially structured for securely holding a workpiece that is gripped between the jaws thereof down on a table of a machine tool.

Another object of the invention is to provide a C clamp having its bight portion shaped to enable mounting of the C clamp with the plane of its frame disposed at an angle to the table of a machine tool.

Still another object of the invention is to provide a C clamp having the bight portion of its frame elongated and formed with a hexagonal cross section to thereby provide a number of angular supporting surfaces about the bight portion by which the frame can be mounted on the table of a machine tool.

Yet another object of the present invention is to provide an improved C clamp structure which is of simple, light weight, construction, and which may be produced at a reasonable cost.

These and other objects, features and advantages of the present invention will be made more readily apparent from the following detailed description of the preferred embodiment as illustrated in the accompanying drawings in which:

FIG. 1 is a perspective view of an improved C clamp 2—embodying the features of the present invention;

FIG. 2 is a cross sectional view as taken along line 2–2 of FIG. 1;

FIG. 3 is a partial view of the bight portion of the C clamp as taken along line 3—3 of FIG. 1;

FIG. 4 is a plan view of a work table of a machine tool having a workpiece securely mounted thereon with the aid of the improved C clamp of the present invention;

FIG. 5 is an elevation view of the setup shown in FIG. 4; and

FIG. 6 is a cross sectional view of a modified bight portion for the C clamp of the present invention.

Referring to the drawings, a perspective illustration of the improved C clamp 10 of the present invention is shown in FIG. 1. The C clamp includes a substantially C-shaped frame 11 having a bight portion 18 and side portions 15 and 19. The end of side portion 19 of the frame 11 is provided with a stationary jaw 12 and the end of side portion 15 of the frame 11 is provided with an internally threaded hub 13 which receives a screw 14. A movable jaw 16 which coacts with the stationary jaw 12 is swivally mounted by a ball and socket joint on one end portion of the screw 14. A lever or handle 17 is mounted for transverse sliding movement on the other end portion of the screw 14 to operate the same.

The frame 11 is preferably a steel forging formed with the side portions 15 and 19 having a rectangular cross section and with the elongated, straight, bight portion 18 having an enlarged, hexagonal, cross section. As shown in FIG. 2, the faces of the hexagonal bight portion form six rectangularly shaped, flat, surfaces 20, 21, 22, 23, 24 and 25 all of which extend in a direction parallel to the axis of the screw 14 and terminate short of the side portions 15 and 19 of the frame 11. The back surface 23 and the front surface 20 of the bight portion are disposed normal to the plane of the frame 11, while the angular surfaces 21 and 22 are disposed to form a triangular section on one side of the bight portion 18, and the angular surfaces 24 and 25 are disposed to form a triangular section on the other side of the bight portion.

The rectangular, flat surfaces on the bight portion 18 enable the frame 11 of the C clamp to be supported by any of the surfaces 20–25 bearing against a flat surface such as the top of the table of a machine tool. When the bight portion 18 is so positioned on its surface 22, for example, the C clamp 10 can then be clamped to a supporting table by means of a hold down means bearing against the opposing, flat surface 25 on the bight portion 18. With the bight portion of the frame 11 securely mounted on the table, a workpiece 27 can then be gripped between the jaws 12 and 16 of the C clamp.

Referring to FIGS. 4 and 5, a description will be presented of a setup showing the manner in which the C clamp of the present invention can be mounted on a table 26 of a machine tool to help securely hold a workpiece 27 in the form of an elongated metal plate so that a cut as by a milling machine cutter (not shown) can be made along the upper horizontal portion 30 thereof.

As shown, a pair of vices 31 and 32 are mounted in spaced relationship on the table 26. The housings of these vices are provided with side lugs 33. Bolts 34 have their heads 35 engaged in the elongated T-slots 36 and 37 formed along the length of the table 26. The body of the bolts 34 extend up through openings in the lugs 35 and are held on their ends by nuts 39. With the respective movable jaws 41 and 42 of the vices 31 and 32 opened by the use of the knurled end portions of the respective screw shafts 43 and 44, a parallel 48 is positioned with its end portions adjacent the respective stationary jaws 49 and 50 thereof. The workpiece 27 is then positioned in the jaws of the vices against the parallel 48. The movable jaws 41 and 42 of the vices are then advanced to tightly grip the end portions of the workpiece 27. It should be understood that when so held the workpiece 27 is not sufficiently supported near the central portion thereof to withstand the forces of a cut being made by a cutter (not shown) along the upper horizontal portion 30 of the workpiece 27, for example.

Thus, when such a long workpiece is supported by the pair of spaced vices 31 and 32, the C clamp 10 of the present invention is mounted on the table 26 between the vices to provide the additional support needed for the workpiece 27. In the particular setup shown in FIGS. 4 and 5, the C clamp 10 is positioned with surface 22 of its bight portion 18 bearing against the surface 28 of the table 26 and with its jaws 12 and 16 positioned on either side of the combined workpiece 27 and parallel 48. A block 51 having the same height as the distance between the lower and upper surfaces 22 and 25 on the bight portion 18 is then positioned on the table 27. A bar clamp 52 is then placed with its end portions respectively resting on the surface 25 of the bight portion 18 and the upper end of block 51. A bolt 53 whose head 55 engages the T-slot 37 on the table 27 extends up through an opening 54 on the bar clamp 52. A nut 56 engaged on the end of the bolt 53 then securely holds the bar clamp 52 down on the table 26. By advancing the screw 14 of the C clamp by use of its operating handle 17 the jaws 12 and 16 are then made to tightly grip the central portion of the workpiece 27.

It should be noted that forming the bight portion 18 of the frame 11 in the form of a hexagonal cross section has several advantages. Thus, in addition to providing large, flat bearing surfaces for mounting the C clamp 10 at various angles to the surface of the table 26, such a construction provides an opposing, spaced, parallel surface on the bight portion 18 for receiving the surface of a clamping means, such as bar clamp 52, to enable holding the bight portion 18 down on the table 26.

Note that it is important in a workpiece setup to provide a substantial bearing surface to transmit the force and vibration of the cutting tool down to the worktable 26. Thus, if the bight portion 18 of the clamp 10 did not have such a large bearing surface and a similar, parallel, opposing surface as provided by the present invention it would not be possible to hold the C clamp by the bar clamp 52 solidly against the table surface 28. Further to be noted in the setup of FIGS. 4 and 5 is that if the bight portion 18 had merely back and front bearing surfaces 23 and 20, the C clamp would have to be necessarily disposed with its frame 11 in a vertical position which would cause it to extend into or even above the horizontal portion 30 of the workpiece 27 being machined. This would interfere with the cutter. This could happen quite often in actual practice, since C clamps are desirably formed with a deep throat to serve the purpose for which they are conventionally used. Thus, in the setup of FIGS. 4 and 5, even if a conventional C clamp happened to have a bearing surface on the back of the bight portion thereof, it could not be used to help support the workpiece 27 on the table. The importance of the hexagonal shape on the bight portion should now be clearly evidenced.

It should be further clear now from the drawings that the improved C clamp 10 of the present invention effectively functions as a vice in workpiece setups in that it performs the same functions as the vices 31 and 32 and is just as effective as long as only a light or moderate cut is being made by a cutter along the upper horizontal portion 30 of the workpiece 27. The advantage of the C clamp of the present invention is that it reduces the cost of the setup fixtures required to be kept on hand for such machine tools. Furthermore, the C clamp of the present invention has a distinct advantage over conventional C clamps since such clamps are conventionally designed to function only near the edge of the work table or to otherwise hold parts together by gripping them between the jaws thereof.

It should be particularly noted that the setup shown in FIGS. 4 and 5 is merely one way in which use can be made of the C clamp 10 of the present invention in machine tools setups. Thus the C clamp 10 of the present invention has general purpose usage. For example, it can be used when it is desired to hold one workpiece at an angular position relative to another by having one of the workpieces held between the jaws 12 and 16 and having the bight portion 18 clamped with any of its supporting surfaces 20–25 against a surface of the second workpiece. Furthermore, the structural improvement of the present invention on the conventional C clamp has the additive advantage that it increases the utility of the C clamp since the conventional uses of the C clamp are not in any way affected thereby.

Referring next to FIG. 6, a cross section of the bight portion 18a of a modified C clamp is shown which is not in the shape of a true hexagon in that a part of the bight portion between the pair of the opposing parallel surfaces such as 23a and 20a, for example, has been laterally broadened to enable an opening 57, partially indicated in the drawing, to be provided therethrough for receiving a bolt to hold the C clamp on the table 26. It should be noted in FIG. 6 that although surface 22a is displaced sidewise relative to opposing surface 25a, these surfaces remain parallel. Thus with such a configuration, clamping means such as bar clamp 52 can still bear on surface 25a of the bight portion 18a when it is desired to mount the C clamp with its surface 22a bearing against the surface of a support.

Although a preferred embodiment of the invention has been illustrated and described in detail, it will be apparent to those skilled in the art that various modifications may be made therein without departing from the spirit of the invention or from the scope of the appended claims.

What is claimed is:

1. A clamp useful for holding a workpiece down on a support, comprising: a substantially C shaped frame having a straight bight portion; a pair of opposing co-acting jaws provided on the ends of said frame; said bight portion being elongated and enlarged with a hexagonal cross section to thereby provide substantially long, wide, flat surfaces about the bight portion with pairs of opposite, flat surfaces being parallel to each other; and means including a flat, engaging surface for securing the frame of said clamp to said support by having a flat surface of said bight portion bearing against a flat surface of said support while said flat surface on said means engages the spaced, opposite, parallel, flat surface on said bight portion.

2. The invention in accordance with claim 1 wherein the pairs of opposite, parallel, flat surfaces on said bight portions all have the same spacing.

3. The invention in accordance with claim 2 wherein said means includes: a block having a height equal to the spacing of opposite parallel, flat surfaces on said bight portion; a bar clamp having an opening therethrough; said bar clamp adapted to be positioned with one end thereof engaging the flat surface on said bight portion opposite said flat bearing surface and the other end thereof engaging the top of said block; a bolt having its head adapted to be inserted in a T-slot on said support and its body extending up through the opening in said bar clamp; and a nut engaging the end of said bolt for securing the bar clamp and thereby the bight portion of the clamp down on said support.

4. A clamp useful for holding a workpiece down on a support comprising: a substantially C shaped frame having a straight, elongated and enlarged bight portion, a stationary jaw on one end of said frame, a screw threadably mounted on the other end of said frame, the axis of said screw being parallel to said elongated bight portion, a movable jaw swivally connected to the inner end of said screw for coacting with said stationary jaw, and a handle transversely mounted on the outer end of said screw operable to clamp a workpiece between said jaws, said bight portion having a hexagonally shaped cross section such as to provide substantially large flat surfaces thereabout, each said flat surface extending in a direction parallel to the axis of said screw and terminating short of the end portions of the frame, with each pair of opposite flat surfaces on said bight portion being disposed parallel to each other and with all the pairs of opposite flat surfaces on said bight portion having the same spacing, the pair of opposite back and front surfaces on said bight portion being perpendicularly oriented relative to the plane of the frame and the pair of opposite side surfaces thereof adjacent one side of the back surface and adjacent the opposite one side of the front surface being angularly oriented in one direction relative to the plane of the frame, and the pair of opposite side surfaces adjacent the other side of the back surface and adjacent the opposite other side of the front surface being angularly oriented in the other direction relative to the plane of the frame, whereby the frame of said clamp can be mounted on said support in an upright position by the back surface of its bight portion or in a tilted position by either of the side surfaces thereof adjacent said back surface.

* * * * *